United States Patent

Hosotsubo et al.

[11] Patent Number: 5,888,928
[45] Date of Patent: Mar. 30, 1999

[54] PROCESS FOR PRODUCING ACTIVATED CARBON FIBER MOLDING AND ACTIVATED CARBON FIBER MOLDING

[75] Inventors: Tomiji Hosotsubo; Toshifumi Kawamura, both of Kamisu; Kouichi Miura, Souraku-gun; Hiroyuki Nakagawa, Kyoto, all of Japan

[73] Assignee: Petoca, Ltd., Tokyo, Japan

[21] Appl. No.: 808,439

[22] Filed: Feb. 28, 1997

[30] Foreign Application Priority Data

Mar. 1, 1996 [JP] Japan ................................. 8-044491

[51] Int. Cl.$^6$ ...................................................... B01J 20/02
[52] U.S. Cl. ........................................ 502/433; 423/447.1
[58] Field of Search ............................ 423/447.1, 447.2, 423/447.6, 447.7; 502/180, 933

[56] References Cited

U.S. PATENT DOCUMENTS

| Re. 29,101 | 1/1977 | Amagi et al. | 423/445 R |
|---|---|---|---|
| 4,351,816 | 9/1982 | Schulz | 423/447.4 |
| 4,816,289 | 3/1989 | Komatsu et al. | 423/447.5 |
| 5,209,975 | 5/1993 | Miyazaki et al. | 423/447.1 |
| 5,310,593 | 5/1994 | Tsujimoto et al. | 428/166 |
| 5,356,574 | 10/1994 | Tomaki et al. | 423/447.6 |

FOREIGN PATENT DOCUMENTS

| 0 297 695 | 1/1989 | European Pat. Off. . |
|---|---|---|
| 0 601 808 A1 | 6/1994 | European Pat. Off. . |
| 25 00 082 | 7/1975 | Germany . |

OTHER PUBLICATIONS

Patent Abstracts of Japan, JP–61–295218, Dec. 26, 1986.
Patent Abstracts of Japan, JP–5–209322, Aug. 20, 1993.
Patent Abstracts of Japan, JP–6–17321, Jan. 25, 1994.
Patent Abstracts of Japan, JP–6–272117, Sep. 27, 1994.
Patent Abstracts of Japan, JP–6–272118, Sep. 27, 1994.
Patent Abstracts of Japan, JP–6–306710, Nov. 1, 1994.
Patent Abstracts of Japan, JP–7–145516, Jun. 6, 1995.

*Primary Examiner*—Michael Lewis
*Assistant Examiner*—Stuart L. Hendrickson
*Attorney, Agent, or Firm*—Oblon, Spivak, McClelland, Maier & Neustadt, P.C.

[57] ABSTRACT

A process for producing an activated carbon fiber molding is disclosed which comprises spinning an isotropic pitch to thereby obtain pitch fibers, infusibilizing the pitch fibers to thereby obtain infusibilized fibers, heating the infusibilized fibers under a mechanical load to thereby obtain a molding and activating the molding. In this process, the infusibilized fibers and/or infusibilized fibers molding may be heated in an inert atmosphere so as to effect a light carbonization thereof and thereafter subjected to the subsequent step of the process. The pitch-based porous activated carbon fiber molding obtained by this process has a strikingly high bulk density and can sufficiently exhibit the specific properties of the activated carbon fiber, e.g. a large specific surface area, to thereby have a high adsorption efficiency.

6 Claims, No Drawings

PROCESS FOR PRODUCING ACTIVATED CARBON FIBER MOLDING AND ACTIVATED CARBON FIBER MOLDING

FIELD OF THE INVENTION

The present invention relates to a novel process for producing a pitch-based activated carbon fiber molding and a porous activated carbon fiber molding which can be produced by the process. More particularly, the present invention is concerned with a process for producing from an optically isotropic pitch as a starting material a pitch-based activated carbon fiber molding, which allows the resultant product to have a strikingly high bulk density and sufficiently exhibit the specific properties of the activated carbon fiber, such as a large specific surface area to thereby have a high adsorption efficiency, and is concerned with a porous activated carbon fiber molding which can be produced by this process.

BACKGROUND OF THE INVENTION

Granular activated carbons and activated carbon fibers are known as exhibiting adsorptivity and desorptivity for various substances. In particular, the activated carbon fiber is fibrous and utilized as it is or molded into appropriate form before use. The activated carbon fiber is widely used in various adsorptive materials such as an adsorbent, a water purifier, a deodorant and a deodorizing filter, a catalyst carrier, etc.

The known activated carbon fibers include not only organic activated carbon fibers prepared from rayon, polyacrylonitrile, phenolic resin and the like as starting materials but also pitch-based activated carbon fibers obtained by spinning pitch, for example, an optically isotropic pitch to thereby obtain pitch fibers, infusibilizing the pitch fibers and carbonizing/activating the infusibilized fibers.

It is believed that the pore structure, pore size, pore density and/or pore distribution of the activated carbon fiber is a factor of utmost importance for causing the activated carbon fiber to possess such a large specific surface area that the adsorptive and desorptive functions of the activated carbon fiber are fully exerted. Accordingly, with respect to the production of the activated carbon fiber from an optically isotropic pitch, various proposals have been made regarding the regulation of conditions in the production of the optically isotropic pitch, in the spinning and infusibilization of the pitch fiber in the carbonization and activation. In this connection, reference is made to Japanese Patent Laid-Open Publication Nos. 61(1986)-295218, 5(1993)-209322, 6(1994)-17321, 6(1994)-272117, 6(1994)-272118, 6(1994)-306710 and 7(1995)-145516.

However, the conventional activated carbon fiber has the problem that its bulk density is too low to make total amount of adsorbed substances sufficiently high even if its adsorbing amount of substances per weight is high with the result that the adsorptive capacity of the activated carbon fiber cannot be fully utilized.

Thus, molding of the activated carbon fibers with the use of a binder or the like has been tried for improving the packing density of the activated carbon fibers. However, the resultant molded article of activated carbon fibers suffer from deterioration of the adsorptivity of the activated carbon fibers per se because of, for example, the clogging of pores of the activated carbon fibers by the binder or the like, so that a high adsorptivity cannot be attained.

The inventors have made extensive and intensive studies in these current circumstances. As a result, it has been found that, in the process for producing the activated carbon fibers from the optically isotropic pitch, the desired activated carbon fiber molding of high bulk density can be provided by shaping the infusibilized fibers under a load and activating the shaped fibers. The present invention has been completed on the basis of the above finding.

OBJECT OF THE INVENTION

The present invention has been made with a view toward solving the above problems of the prior art. It is a primary object of the present invention to provide a process for producing from an optically isotropic pitch as a starting material a pitch-based activated carbon fiber molding, which allows the resultant product to have a strikingly high bulk density and sufficiently exhibit the specific properties of the activated carbon fiber, such as a large specific surface to thereby have a high adsorption efficiency. Another object of the present invention is to provide a porous activated carbon fiber molding which can be produced by this process.

SUMMARY OF THE INVENTION

The process for producing an activated carbon fiber molding according to the present invention comprises spinning an isotropic pitch to thereby obtain pitch fibers, infusibilizing the pitch fibers to thereby obtain infusibilized fibers, heating the infusibilized fibers under a mechanical load to thereby obtain a molding and activating the molding.

In the process of the present invention, the infusibilized fibers may be heated in an inert atmosphere so as to effect a light carbonization thereof prior to the heating of the infusibilized fibers under the mechanical load for obtaining the molding.

Further, in the process of the present invention, the molding of the infusibilized fibers or lightly carbonized fibers may be heated in an inert atmosphere so as to effect a carbonization thereof prior to the activation of the molding.

In the process of the present invention for producing the activated carbon fiber molding, it is preferred that the infusibilized fibers contain oxygen in an amount of 2 to 30% by weight, especially, 5 to 20% by weight.

Moreover, it is preferred that the infusibilized fibers or lightly carbonized fibers be molded under an applied load of 200 kg/cm² or below, especially, from 100 to 200 kg/cm² at room temperature to 600° C., especially from 200° to 600° C. and, still especially, from 250° to 500° C. in an inert atmosphere.

The porous activated carbon fiber molding of the present invention is produced by the process as described above and has a bulk density of 0.3 to 1.0 g/cm³, preferably, 0.5 to 1.0 g/cm³.

From another viewpoint, the porous activated carbon fiber molding of the present invention has a bulk density of 0.3 to 1.0 g/cm³, preferably, 0.5 to 1.0 g/cm³.

In the above porous activated carbon fiber molding of the present invention, the pores formed of inter-fiber voids (macropores) have an equivalent diameter of at least 10 nm and the pores formed in each fiber (macropores) have an equivalent diameter of about 0.15 to 2.5 nm.

DETAILED DESCRIPTION OF THE INVENTION

The porous activated carbon fiber molding of the present invention and the process for producing the same will be described in detail below.

In the process for producing an activated carbon fiber molding according to the present invention, an optically isotropic pitch is spun to thereby obtain pitch fibers; the pitch fibers are infusibilized to thereby obtain infusibilized fibers; the infusibilized fibers are molded under a load; and the molding is activated to thereby obtain the activated carbon fiber molding.

In the process of the present invention, an optically isotropic pitch is used as the raw material of the pitch fibers because the activation can be facilitated. Various materials can be mentioned as the starting material for obtaining the optically isotropic pitch, which include, for example, those prepared by subjecting crude oil distillation residue, naphtha cracking residue, ethylene bottoms, oil produced by coal liquefaction, coal tar, synthetic pitch or the like to treatments such as filtration, purification, distillation, hydrogenation, catalytic cracking, oxidation and nongraphitization.

Further, the optically isotropic pitch can be obtained, for example, by heating any of the above starting materials of pitch or by removing optically anisotropic components from the above heated pitch. Still further, the optically isotropic pitch can be obtained by heating the above starting material in the presence of a crosslinking agent such as oxygen. This optically isotropic pitch can be employed as long as it can be spun into pitch fibers of desired configuration and is not particularly limited with respect to other properties, components, etc.

The optically isotropic pitch can be spun into the itch fibers by the use of any of the customary spinning techniques such as melt spinning, centrifugal spinning, vortex spinning and melt blow spinning techniques. Of these, the melt blow technique is preferred from the viewpoint that the desired pitch fibers can continuously be produced in large quantity to thereby ensure advantage of the technique in respect of cost.

The obtained pitch fibers may be in any state of long-fibers, a felt or a mat. The pitch fibers in the state of a felt or mat which can easily be produced by the melt blow technique are preferred from the economic point of view.

The thus obtained optically isotropic pitch fibers are infusibilized to thereby obtain infusibilized pitch fibers.

It is preferred that the infusibilization of the optically isotropic pitch fibers be conducted under conditions such that the oxygen content of the infusibilized pitch fibers ranges from 2 to 30% by weight, especially, from 5 to 20% by weight.

When the oxygen content exceeds 30% by weight, the infusibilized pitch fibers have poor moldability in the subsequent molding step, and the yield is likely to be lowered in the carbonization or activation step. On the other hand, when the oxygen content is below 2% by weight, the retention of the fiber form is occasionally disenabled.

This infusibilization is performed, for example, by oxidizing the pitch fibers under conditions such that the temperature is raised at a rate of 0.2° to 20° C./min and the oxidation temperature ranges from 150° to 400° C., preferably, from 180° to 320° C. This infusibilization is conducted in the atmosphere of a gas, for example, oxygen-enriched air or air. This gas may contain in some proportion another gas such as chlorine gas or nitrogen oxide gas.

In the above infusibilization, it is preferred that the yield of the infusibilized pitch fibers range from 103 to 110%.

Although the thus obtained infusibilized pitch fibers are molded under a load, followed by activation of the resultant infusibilized pitch fiber molding, in the process of the present invention, the infusibilized pitch fibers may be lightly carbonized prior to this molding step.

This light carbonization prior to the molding step is conducted, for example, in an inert gas such as nitrogen gas under conditions such that the temperature is raised at a rate of 5° to 100° C./min and the carbonization temperature is not higher than 700° C., preferably, not higher than 600° C. Conducting this light carbonization prior to the molding step increases the mechanical strength of the fibers to thereby improve the handling easiness thereof.

The bulk density of the porous activated carbon fiber molding as a final product is increased in accordance with the increase of the load applied in the molding step, so that the porous activated carbon fiber molding of desired bulk density, especially, bulk density ranging from 0.3 to 1.0 $g/cm^3$ can be obtained by regulating the amount of fiber packed in a molding die and the intensity of applied mechanical load.

In the present invention, the molding of infusibilized pitch fiber or lightly carbonized fiber is produced by performing heat molding of the infusibilized pitch fibers or lightly carbonized fibers under an applied load of 200 $kg/cm^2$ or below, preferably, from 100 to 200 $kg/cm^2$ at room temperature to 600° C., preferably from 200° to 600° C. and, still preferably, from 250° to 500° C. in an inert atmosphere.

The pores of the molding prior to the activation remain even after the activation and facilitate the diffusion of adsorbates, thereby contributing to the improvement of the adsorptivity of the porous activated carbon fiber molding as a final product. When the applied load exceeds 200 $kg/cm^2$, however, the number of pores having a diameter of at least 10 nm, formed of inter-fiber voids within the molding, is likely to conspicuously decrease. In this molding having the number of such pores decreased, it is difficult for the activation to advance to an internal part of the molding and cracking may occur in the carbonization or activation step.

Although the thus obtained infusibilized pitch fiber molding or lightly carbonized fiber molding as it is may be activated, carbonization thereof may be conducted prior to the activation.

This carbonization is conducted, for example, in an inert gas such as nitrogen gas under conditions such that the temperature is raised at a rate of 5° to 100° C./min and the carbonization temperature is not higher than 1000° C., preferably, not higher than 800° C. Conducting this light carbonization prior to the molding step facilitates the activation in the form of the molding.

The activation of the molding may be performed according to the customary procedure. For example, the activation comprises heating the molding in the atmosphere of steam, carbon dioxide or the like at, generally, 700° to 1500° C. for a period of some minutes to about 24 hours. The apparatus in which the above activation is carried out is not particularly limited. For example, it may be a vertical or horizontal activating oven or a batch or continuous activating oven.

In the activation step, the pore size and density of the activated carbon fiber constituting the final activated carbon fiber molding can be regulated by controlling conditions under which the activation is carried out. That is, the activated carbon fiber of uniform pore density whose pore radius is small and uniform can be obtained by increasing the activation temperature and shortening the activation period even if the specific surface area is unchanged. On the other hand, the activated carbon fiber whose pore radius is varied in wide range is obtained by lowering the activation temperature and prolonging the activation period. When the activation period is unchanged, the increase of the activation temperature invites the tendency that the specific surface area is enlarged and pores of large radii are formed. The prolongation of the activation period at unchanged activation temperature invites the tendency that pores of large radius are included although the pore density is increased.

Therefore, in the process of the present invention, the activated carbon fibers can have highly diversified pore radius and/or highly diversified pore density by selecting individual production conditions within the above ranges. As a result, the selective adsorption range is enlarged and a large variety of products cap be provided depending on the type of adsorbate and the field of application of the activated carbon fibers.

The porous activated carbon fiber molding whose bulk density ranges from 0.3 to 1.0 g/cm$^3$, preferably, from 0.5 to 1.0 g/cm$^3$ can be produced by the above process of the present invention.

When the bulk density is below 0.3 g/cm$^3$, the packing efficiency is poor and the desired adsorptive performance cannot be attained. Further, the activated carbon fiber molding whose bulk density is below 0.3 g/cm$^3$ can be produced by the conventional process and, except for special use, there is no advantage in employing the process of the present invention therefor. On the other hand, when the bulk density exceeds 1.0 g/cm$^3$, the load applied in the molding step must be greater than 200 kg/cm$^3$, so that not only is cracking likely to occur in the carbonization/activation steps, as mentioned above, but also the pores tend to disappear to thereby deteriorate the adsorptivity of the activated carbon fiber molding.

The activated carbon fiber molding which can be produced by the process of the present invention, i.e., the porous activated carbon fiber molding of the present invention is preferred to have the above ranged bulk density and include pores formed of inter-fiber voids and having a diameter of 10 nm (macropores).

The pores of the above porous activated carbon fiber molding facilitate the diffusion of adsorbates to thereby contribute to the enhancement of the adsorptivity of the molding.

Moreover, the activated carbon fiber constituting the porous activated carbon fiber molding of the present invention can be caused to have, for example, a pore radius ranging from 0.15 to 2.5 nm, preferably, from 0.4 to 2.0 nm (micropores) and a specific surface area (BET) of at least 500 m$^2$/g, preferably, from 1500 to 3000 m$^2$/g by selecting production conditions.

The above porous activated carbon fiber molding prepared from the optically isotropic pitch according to the present invention is suitable for use as elements of various adsorptive materials such as a gas-phase (e.g., trihalomethane) or liquid-phase adsorbent, a water purifier, a deodorant and a deodorizing filter, and catalyst carriers, etc.

EFFECT OF THE INVENTION

According to the process for produce an activated carbon fiber molding of the present invention, the porous activated carbon fiber molding whose bulk density ranges from 0.3 to 1.0 g/cm$^3$ can be provided since the activated carbon fiber molding prepared by spinning an isotropic pitch to thereby obtain pitch fibers, infusibilizing the pitch fibers to thereby obtain infusibilized fibers, heating the infusibilized fibers under a mechanical load to thereby obtain a molding and activating the molding.

The pitch-based porous activated carbon fiber molding of the present invention has a bulk density as strikingly high as 0.3 to 1.0 g/cm$^3$ and the specific properties of the activated carbon fibers, i.e., large specific surface area and excellent adsorptivity can satisfactorily be exerted with the result that the porous activated carbon fiber molding exhibits a high adsorption efficiency. Therefore, the porous activated carbon fiber molding of the present invention is suitable for use as elements of various adsorptive materials such as a gas-phase (e.g., trihalomethane) or liquid-phase adsorbent, a water purifier, a deodorant and a deodorizing filter, and catalyst carriers, etc.

EXAMPLE

The present invention will be illustrated in greater detail below with reference to the following Examples, which in no way limit the scope of the present invention.

Example 1

(1) Production of pitch fiber:

Pitch fibers were produced by the melt blow technique, in which an optically isotropic pitch (softening point: 260° C., QI: not greater than 1% by weight) was spun through a nozzle comprising a 2 mm wide slit and, arranged therein, a row of 1000 spinning orifices each having a diameter of 0.2 mm. During the spinning, the pitch delivery, pitch temperature, heated air temperature and air injection speed were set at 500 g/min, 330° C., 380° C. and 320 m/sec, respectively. Spun pitch fibers were collected on a belt having a collection zone of 35-mesh stainless steel net while sucking from the back of the belt, thereby obtaining a mat of pitch fibers.

(2) Infusibilization of pitch fiber:

The obtained mat of pitch fibers was oxidized with air by heating it in an air stream so that its temperature was raised to 300° C., thereby obtaining infusibilized fibers. The oxygen content of the infusibilized fibers was 8.0% and the infusibilization yield was 106%.

(3) Shaping of infusibilized fiber:

The infusibilized fibers were packed in a SUS pressure molding machine and heated at a rate of 20° C./min to 400° C. under a load of 200 kg/cm$^2$ mechanically applied and maintained, thereby obtaining an infusibilized fiber molding.

(4) Activation of infusibilized fiber molding:

The infusibilized fiber molding was activated by heating it at 900° C. in a nitrogen atmosphere containing steam in a concentration of 50%, thereby obtaining a porous activated carbon fiber molding.

The resultant porous activated carbon fiber molding exhibited a bulk density of 0.86 g/cm$^3$ and a specific surface area of 1600 m$^2$/g and had micropores of 1.4 nm in average pore size together with macropores of at least 10 nm in pore size having a peak at hundreds of nanometers as measured by a mercury porosimeter.

Comparative Example 1

The infusibilized fibers obtained in the same manner as in Example 1 were packed in the SUS pressure molding machine and subjected to the same molding operation as in Example 1, except that a load of 300 kg/cm$^2$ was applied to the infusibilized fibers. Cracking occurred and desirable molding was not obtained.

Comparataive Example 2

The influsibilized fibers obtained in the same manner as in Example 1 were packed in the SUS pressure molding machine and subjected to the same molding operation as in Example 1, except that the molding temperature was 700° C. As a result, the fibers were partially molten and the resultant molding could not used in the next activation treatment.

Comparative Example 3

The influsibilized fibers obtained in the same manner as in Example 1 were packed in the SUS pressure molding machine and subjected to the same molding operation and activation as in Example 1, except that a load of 250 kg/cm² was applied to the infusibilized fibers.

The resultant porous activated carbon fiber molding exhibited a bulk density of 1.20 g/cm³ but had a specific surface of 800 m²/g, and the activation treatment was difficult.

Example 2

The infusibilized fibers obtained in the same manner as in Example 1 were lightly carbonized by heating under the conditions such that the temperature was raised at a rate of 30° C./min to 600° C. in a nitrogen gas atmosphere.

The resultant lightly carbonized fibers were molded under the same conditions as in Example 1, and the thus obtained lightly carbonized fiber molding was activated under the same conditions as in Example 1.

The resultant porous activated carbon fiber molding exhibited a bulk density of 0.92 g/cm³ and a specific surface area of 1390 m²/g and had micropores of 1.3 nm in average pore size together with macropores of at least 10 nm in pore size having a peak at hundreds of nanometers.

Example 3

The infusibilized fiber molding obtained in the same manner as in Example 1 was carbonized by heating at 950° C. in a nitrogen atmosphere and thereafter activated under the same conditions as in Example 1.

The resultant porous activated carbon fiber molding exhibited a bulk density of 0.87 g/cm³ and a specific surface area of 1550 m²/g and had micropores of 1.4 nm in average pore size together with macropores of at least 10 nm in pore size having a peak at hundreds of nanometers.

Example 4

The infusibilized fibers obtained in the same manner as in Example 1 were packed in the SUS pressure molding machine and subjected to the same molding operation as in Example 1, except that a load of 100 kg/cm² was applied to the infusibilized fibers. The obtained fiber molding was activated under the same conditions as in Example 1.

The resultant porous activated carbon fiber molding exhibited a bulk density of 0.45 g/cm³ and a specific surface area of 1700 m²/g and had micropore of 1.5 nm in average pore size together with macropores of at least 10 nm in pore size having a peak at hundreds of nanometers as measured by a mercury porosimeter.

Example 5

The infusibilized fibers obtained in the same manner as in Example 1 were subjected to the same molding operation as in Example 1, except that the molding temperature was 200° C.

The resultant porous activated carbon fiber molding exhibited a bulk density of 0.75 g/cm³ and a specific surface are of 650 m²/g and had micropores of 1.5 nm in average pore size together with macropores of at least 10 nm in pore size having a peak at hundreds of nanometers as measured by a mercury porosimeter.

What is claimed is:

1. A process for producing an activated carbon fiber molding, which comprises:
    a) spinning an isotropic pitch to thereby obtain pitch fibers,
    b) infusibilizing the pitch fibers to thereby obtain infusibilized fibers which contain oxygen in an amount of 2 to 30% by weight, and
    c) heating the infusibilized fibers under a mechanical load to thereby obtain a molding and activating the molding.

2. The process of claim 1, wherein the infusibilized fibers are heated at a temperature of not higher than 700° C. in an inert atmosphere prior to the heating of the infusibilized fibers under a mechanical load for obtaining the molding.

3. The process of claim 1, wherein the molding is heated at a temperature of not higher than 1000° C. in an inert atmosphere prior to the activation of the molding.

4. The process of claim 1, wherein the infusibilized fibers or those after heated at a temperature of not higher than 700° C. in an inert atmosphere are molded under an applied load of 200 kg/cm² or less at room temperature to 600° C. in an inert atmosphere.

5. The process of claim 4, wherein said infusibilized fibers or those after heated at a temperature of not higher than 700° C. in an inert atmosphere are molded under an applied load of from about 100 to 200 kg/cm² at about 200° to 600° C.

6. The process as claimed in claim 5, wherein said infusibilized fibers or those after heated at a temperature of not higher than 700° C. in an inert atmosphere are molded under an applied load of from about 100 to 200 kg/cm² at from about 250° to 500° C. in an inert atmosphere.

* * * * *